United States Patent
Tsutsui

(10) Patent No.: US 7,688,909 B2
(45) Date of Patent: Mar. 30, 2010

(54) RADIO COMMUNICATION SYSTEM, RADIO COMMUNICATION METHOD, RADIO TRANSMITTER AND RADIO RECEIVER

(75) Inventor: Masafumi Tsutsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 889 days.

(21) Appl. No.: 11/260,808

(22) Filed: Oct. 27, 2005

(65) Prior Publication Data
US 2007/0009016 A1 Jan. 11, 2007

(30) Foreign Application Priority Data
Jul. 7, 2005 (JP) ............................. 2005-198662

(51) Int. Cl.
*H04B 7/02* (2006.01)
*H04L 1/02* (2006.01)
(52) U.S. Cl. .................. 375/267; 375/299; 375/347
(58) Field of Classification Search ................ 375/267, 375/299, 347; 455/101, 272, 562.1
See application file for complete search history.

(56) References Cited

U.S. PATENT DOCUMENTS

| | | | |
|---|---|---|---|
| 7,233,625 B2 * | 6/2007 | Ma et al. | 375/299 |
| 2004/0001556 A1 * | 1/2004 | Harrison et al. | 375/267 |
| 2004/0252629 A1 | 12/2004 | Hasegawa et al. | |
| 2005/0276360 A1 * | 12/2005 | Fujii et al. | 375/347 |
| 2006/0035674 A1 * | 2/2006 | Karaoguz et al. | 455/562.1 |
| 2008/0192683 A1 * | 8/2008 | Han et al. | 370/329 |

FOREIGN PATENT DOCUMENTS

| | | |
|---|---|---|
| CN | 1613218 | 5/2005 |
| JP | 2004-72624 | 3/2004 |
| JP | 2004-194262 | 7/2004 |

OTHER PUBLICATIONS

First Notification of Office Action dated Apr. 3, 2009, for corresponding Chinese Application 200510124362.2.
M. Sawabashi, et al. Outline of Broadband Radio Access System. NTT Technology Journal, Jul. 2004 (English Translation of line 30 p. 20 to line 32 p. 22 and Fig. 10, 11).
H Ashinda Phone Adaptive Array Antenna, retrieved Jun. 15, 2005 from http://www.willcom-inc/ja/p_s/products/h/antenna.html.
Buffalo Co., LTD. Advanced Radio LAN Technology-MIMO-Mounted Radio Broadband Router, retrieved Jun. 15, 2005 from http://buffalo.melcoinc.co.jp/products/catalog/network/wzr-g108/index.html.

* cited by examiner

*Primary Examiner*—Betsy L Deppe
(74) *Attorney, Agent, or Firm*—Katten Muchin Rosenman LLP

(57) ABSTRACT

A radio transmitter includes an orthogonal transformation unit for carrying out an orthogonal transformation on pilot signals having orthogonal relation to each other between transmission antennas and a pilot multiplexing unit multiplexing the pilot signals and transmission data, and a radio receiver includes a channel estimation unit obtaining a channel estimate of a directive multibeam for each of reception antennas, an inverse transformation unit carrying out an inverse transformation of the orthogonal transformation on the obtained channel estimate and a received signal processing unit selectively conducting first processing based on the beam channel estimate in the first mode or second processing based on the channel estimate obtained by the inverse transformation unit in the second mode. This commonizes a common pilot for MIMO (second mode) and individual pilots for AAA (first mode), thus realizing the coexistence of MIMO and AAA without leading to a reduction of throughput.

23 Claims, 9 Drawing Sheets

RADIO COMMUNICATION SYSTEM, RADIO COMMUNICATION METHOD, RADIO TRANSMITTER AND RADIO RECEIVER

CROSS REFERENCE TO RELATED APPLICATIONS

This application is based on and hereby claims priority to Japanese Application No. 2005-198662 filed on Jul. 7, 2005 in Japan, the contents of which are hereby incorporated by reference.

BACKGROUND OF THE INVENTION (1) Field of the Invention

The present invention relates to a radio communication system, radio communication method, radio transmitter and radio receiver, and more particularly to a technique suitable for use in a radio communication system employing a plurality of antennas (multiantenna).

(2) Description of the Related Art

[Radio Transmission using Multiantenna]

In recent years, a requirement has been made for a mobile communication system capable of realizing low-SNR (Signal to Noise Ratio) operations and high-speed data transmissions, and such a mobile communication system has been under examination. In this case, as multiantenna systems, for example, there have been known MIMO (Multi-InputMulti-Output) and AAA (Adaptive Array Antenna).

The former (MIMO) is a technique employing a transmitter having a plurality of antennas and a receiver having a plurality of antennas to carry out the transmission and reception of independent data stream through each of the antennas for improving the transmission rate, while the latter (AAA) is a technique of carrying out the transmission and reception of one data stream after the formation of beams with directivity through the use of a transmitter having a plurality of antennas and a receiver having a plurality of antennas for improving communication quality and achieving interference suppression.

The research and development of a multiantenna system for use in a mobile communication system and the partial introduction thereinto prevail at present. For example, the AAA was introduced into a portion of a PHS (Personal Handyphone System) and a report was made as "offer of more stable call environment, follow-up of moving telephone, improvement of effective frequency utilization factor to twice or more" (for example, see non-patent document 1 mentioned later). Moreover, a product made by applying the MIMO technique to a radio LAN system appeared, and a report was made as "realization of twice as high as conventional high-speed radio throughput" (for example, see non-patent document 2 mentioned later).

Thus, the application of the multiantenna technique to a mobile communication system already started.

Secondly, a description will be given hereinbelow of a (systematic) research situation of a multiantenna transceiving technique for the application to the mobile communication system in the future.

As various types of multiantenna transceiving techniques, there are (A) MIMO multiplexing method, (B) MIMO diversity method and (C) AAA transceiving method, and a study has been made thereon (for example, see non-patent document 3 mentioned later). A comparative table mentioned in this document is the following table 1.

TABLE 1

Comparison Among Multiantenna Transmitter-Receiver Configurations

|  |  | (A) MIMO Multiplexing Method | (B) MIMO Diversity Method | (C) AAA Transmission Method |
|---|---|---|---|---|
| Effect |  | Increase in Information Bit Rate (High-Speed Data Transmission) | Increase in Diversity Gain (Improvement of Communication Quality) | Increase in Average Reception SIR (Improvement of Communication Quality) |
| Interval of Antennas Required |  | Large | Large | Small |
| Fading Correlation | High | Signal Demultiplexing Capability: Low | Transmission Diversity Gain: Low | Antenna Gain: High |
|  | Low | Signal Demultiplexing Capability: High | Transmission Diversity Gain: High | Antenna Gain: Low |
| Interference Suppression Effect between Own Cell and Other Cell |  | No | No | Exist |
| RF Circuit Calibration |  | Unnecessary | Unnecessary | Necessary |

As seen from this table 1, the MIMO techniques (A) and (B) are advantageous when the inter-antenna correlation is low (close to no correlation), while the AAA technique (C) is advantageous when the inter-antenna correlation is high (close to 1). Moreover, in the case of the MIMO multiplexing method (A), the information rate is increasable by increasing the number of antennas, while in the case of the MIMO diversity method (B) and the AAA transmission method (C), although the information rate does not increase with an increase in the number of transmission antennas, the diversity gain and the antenna gain are improvable.

In connection with the results in this non-patent document 3, the following patent document 1 (for example, Claims 1 to 3) discloses a method of, in a case in which an SIR (power ratio between a desired signal and an adjacency interference) is below a given threshold, making the switching from a plurality of data streams independent of each other to a plurality of data streams produced from the same data stream. In this case, it can be considered that the former (the plurality of streams) corresponds to the MIMO multiplexing method (A) in the foregoing table 1, while the latter (the same stream) corresponds to the MIMO diversity method (B).

In addition, the following patent document 2 (for example, Claims 1 to 4, 7) discloses a signal transmission system of carrying out a transmission mode for transmitting signals independent of each other from a transmission antenna and a mode for signals dependent on each other through the use of means for estimating a propagation line between transmission and reception, means for estimating a communication capacity at every transmission mode, means for determining a transmission mode and means for calculating a spatial correlation value between antennas in the reception side. With respect to these transmission modes, in the foregoing table 1, the former (independent signal) corresponds to the MIMO multiplexing method (A), while the latter (dependent signal) corresponds to a technique close to the AAA transmission method (C).

Patent Document 1: Japanese Patent Laid-Open No. 2004-72624

Patent Document 2: Japanese Patent Laid-Open No. 2004-194262

Non-Patent Document 1: WILLCOMinc., "H" • Anshinda Phone Adaptive Array • Antenna", [online], [Retrieval Date: Jun. 15, 2005], Internet <URL:http://WWW.willcom⁻in-c.com//p_s/products/h/antenna.h tml>

Non-Patent Document 2: Buffalo Co., Ltd., "AdvancedRadio LAN Technology-MIMO-Mounted" Radio Broadband Router", [online], [Retrieval Date: Jun. 15, 2005], Internet <URL:http://buffalo.melcoinc.co.jp/products/catalog/network/wzr⁻g108/index.html>

Non-Patent Document 3: Mamoru SAWABASHI and 5 persons, "Outline of Broadband Radio Access System" NTT Technology Journal (the July 2000 issue), p. 20-22

In a radio communication apparatus having a multiantenna, it is considered that a higher data transmission is made in accordance with a situation of communication at any given time for improving the sector (cell) throughput. For realizing this, both the MIMO and AAA may be provided to be selectively used in a switching fashion. Accordingly, it is an object to provide a method of combining the MIMO and the AAA in cooperation.

In the case of a radio line, for compensating for the phase turn occurring in a propagation line, a pilot signal is used which serves as a phase reference. According to the MIMO technique, an orthogonal pilot for each antenna is used to estimate a channel for a signal to be transmitted from each antenna. This pilot signal is used in common among all the users and, hence, it is referred to as a common pilot.

When the MIMO pilot signal is used for the AAA, since a data unit produces and transmits a beam with directivity, different propagation paths are employed between the pilot signal and the data signal and, hence, difficulty is encountered in employ it for the channel estimation. For this reason, there is a need to add a pilot signal with a different directivity and transmit it.

However, this leads to a decrease in transmission rate (throughput) and requires the information on the added pilot signal and the processing therefor. The pilot signal for the AAA is referred to as an individual pilot because it is required for each user.

SUMMARY OF THE INVENTION

The present invention has been developed with a view to eliminating these problems, and it is therefore an object of the invention to put a common pilot for MIMO and an individual pilot for AAA, which have so far been handled separately, in common for realizing the coexistence of the MIMO and the AAA without causing a decrease in throughput.

For this purpose, the present invention features the employment of the following radio communication system, radio communication method, radio transmitter and radio receiver.

(1) A radio communication system according to the present invention comprises a radio transmitter including a plurality of transmission antennas, transmission data producing means for selectively producing transmission data to be transmitted with a directive multibeam from the transmission antennas in a first mode or transmission data to be independently transmitted from the transmission antennas in a second mode, orthogonal transformation means for carrying out an orthogonal transformation on a plurality of pilot signals having orthogonal relation to each other between the transmission antennas so as to form the directive multibeam having orthogonal relation, and pilot multiplexing means for multiplexing the pilot signals orthogonally transformed by the orthogonal transformation means and the transmission data produced by the transmission data producing means, and a radio receiver including a plurality of reception antennas, channel estimation means for correlating, for each of the reception antennas, a received signal received by the reception antenna with a replica signal of each of the pilot signals to obtain a channel estimate (estimated value) of the directive multibeam, inverse transformation means for carrying out an inverse transformation of the orthogonal transformation on the channel estimate of the directive multibeam obtained by the channel estimation means to obtain a channel estimate on the transmission antenna, and received signal processing means for selectively conducting first received signal processing on the basis of the channel estimate of the directive multibeam obtained by the channel estimation means and the received signal in the first mode or second received signal processing on the basis of the channel estimate on the transmission antenna obtained by the inverse transformation means and the received signal in the second mode.

(2) In addition, in accordance with the present invention, there is provided a radio communication method for use in a radio communication system including a radio transmitter having a plurality of transmission antennas and a radio receiver having a plurality of reception antenna, comprising the steps of, in the radio transmitter, selectively producing transmission data to be transmitted with a directive multibeam from the transmission antennas in a first mode or transmission data to be independently transmitted from the transmission antennas in a second mode, carrying out an orthogonal transformation on a plurality of pilot signals having orthogonal relation to each other between the transmission antennas so as to form the directive multibeam having the orthogonal relation, multiplexing the pilot signals orthogonally transformed and the transmission data and transmitting the multiplexed data through the transmission antennas, and the steps of, in the radio receiver, correlating, for each of the reception antennas, a received signal received by the reception antenna with a replica signal of each of the pilot signals to obtain a channel estimate of the directive multibeam, carrying out an inverse transformation of the orthogonal transformation on the obtained channel estimate of the directive multibeam to obtain a channel estimate on the transmission antenna and selectively conducting first received signal processing on the basis of the channel estimate of the directive multibeam and the received signal in the first mode or second received signal processing on the basis of the channel estimate on the transmission antenna, obtained through the inverse transformation, and the received signal in the second mode.

(3) In this case, it is preferable that, in the radio transmitter, a fast Fourier transformation (FFT) is carried out as the orthogonal transformation and, in the radio receiver, an inverse fast Fourier transformation (IFFT) is conducted as the inverse transformation.

(4) Furthermore, in accordance with the present invention, there is provided a radio transmitter comprising a plurality of transmission antennas, transmission data producing means for selectively producing transmission data to be transmitted with a directive multibeam from the transmission antennas in a first mode or transmission data to be independently transmitted from the transmission antennas in a second mode, orthogonal transformation means for carrying out an orthogonal transformation on a plurality of pilot signals having orthogonal relation to each other between the transmission antennas so as to form the directive multibeam having the orthogonal relation, and pilot multiplexing means for multiplexing the pilot signals orthogonally transformed by the orthogonal transformation means and the transmission data produced by the transmission data producing means.

(5) In this configuration, it is also appropriate that the transmission data producing means includes a beam direction adjusting unit for applying a phase turn to a transmission weighting factor on the transmission data for each of the transmission antennas in the first mode to adjust a direction of the directive multibeam while maintaining the orthogonal relation of the directive multibeam.

(6) In addition, it is also appropriate that the transmission data producing means is made to adjust a transmission weighting factor on the transmission data for each of the transmission antennas in the first mode for transmitting the transmission data and the pilot signals through the use of the same directive multibeam.

(7) Still additionally, the transmission data producing means is made to adjust a transmission weighting factor on the transmission data for each of the transmission antennas in the first mode for transmitting the transmission data and the pilot signals through the use of different directive multibeams.

(8) Moreover, in accordance with the present invention, there is provided a radio receiver comprising a plurality of reception antennas for, when a radio transmitter carries out an orthogonal transformation on a plurality of pilot signals having orthogonal relation to each other between a plurality of transmission antennas and multiplexes the pilot signals and transmission data to be transmitted through a directive multibeam from the plurality of transmission antennas in a first mode or transmission data to be transmitted independently from the transmission antennas in a second mode for transmitting the multiplexed data as a signal from the transmission antennas, receiving the signal transmitted from the transmission antennas, channel estimation means for correlating, for each of the reception antennas, a received signal received by the reception antenna with a replica signal of each of the pilot signals to obtain a channel estimate of the directive multibeam, inverse transformation means for carrying out an inverse transformation of the orthogonal transformation on the channel estimate of the directive multibeam obtained by the channel estimation means to obtain a channel estimate on the transmission antenna, and received signal processing means for selectively conducting first received signal processing on the basis of the channel estimate of the directive multibeam obtained by the channel estimation means and the received signal in the first mode or second received signal processing on the basis of the channel estimate on the transmission antenna obtained by the inverse transformation means and the received signal in the second mode.

(9) In this configuration, it is also appropriate that the channel estimation means includes a selection unit for selecting the channel estimate of the directive beam having the highest correlation from the channel estimates of the directive multibeam obtained with respect to the reception antennas and for outputting the selected channel estimate to the received signal processing means.

(10) Moreover, it is also appropriate that the channel estimation means includes a weighting composition unit for making a composition on, of the channel estimates of the directive multibeam obtained with respect to the respective reception antennas, two or more channel estimates of directive beams having high correction through the use of weighting according to the correlation and for outputting it to the received signal processing means.

According to the present invention, the radio transmitter carries out an orthogonal transformation on a plurality of pilot signals having orthogonal relation to each other and multiplexes them and transmission data to transmit the transmission data through the use of a directive multibeam having orthogonal relation while the radio receiver correlates the received signal with a replica signal of each of the pilot signals to obtain a channel estimate of the directive multibeam. In addition, in the first mode, the first received signal processing is conducted using a channel estimate of the directive multibeam to obtain reception data while, in the second mode, the inverse transformation of the orthogonal transformation is carried out on the channel estimate of the directive multibeam to obtain a channel estimate on the transmission antenna so that the second received signal processing is conducted using the obtained channel estimate to obtain reception data.

That is, since pilot signals are commonized for the first and second modes, without adding individual pilot dedicated to the directive beam transmission, in other words, without causing a decrease in transmission efficiency (transmission rate) (while realizing a higher throughput), the coexistence of the first mode (for example, AAA) and the second mode (for example, MIMO) becomes realizable in the same antenna and apparatus. Therefore, the degree of freedom of the system configuration is improvable. Moreover, the transceiving processing for the addition of individual pilot is unnecessary and, hence, the complication of circuits is avoidable.

DESCRIPTION OF THE PREFERRED EMBODIMENTS

[A] Description of Embodiment

Figure 1:
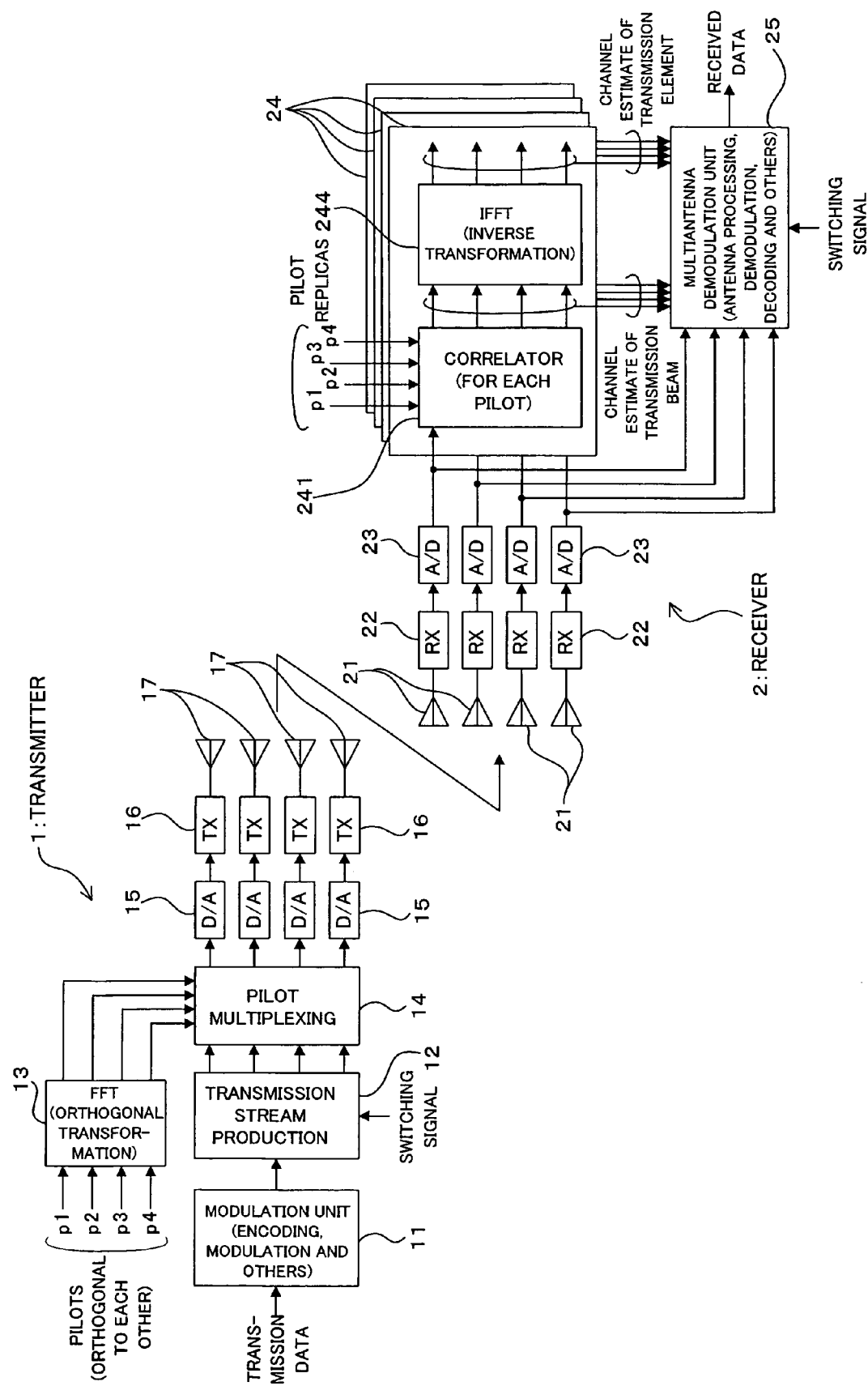
FIG. 1 is a block diagram showing a configuration of a radio communication system according to an embodiment of the present invention.

FIG. 1 is a block diagram showing a configuration of a radio communication system according to an embodiment of the present invention. The radio communication system shown in FIG. 1 comprises a radio transmitter (multiantenna transmitter) 1 equipped with a multiantenna system and a radio receiver (multiantenna receiver) 2 equipped with a multiantenna system. For example, the radio transmitter (hereinafter referred to simply as a "transmitter") 1 comprises, as its essential configuration, a modulation unit 11, a transmission stream producing unit 12, a fast Fourier transformer (FFT) 13, a pilot multiplexing unit 14, a plurality of (in this case, four) transmission antennas 17, digital/analog converters (D/A) 15 each provided for each of the transmission antennas 17, and radio transmission units (TX) 16 each for each of the transmission antennas 17. On the other hand, for example, the radio receiver (hereinafter referred to simply as a "receiver") 2 comprises, as its essential configuration, a plurality of (in this case, four) reception antennas 21, radio reception units (RX) 22 each provided for each of the reception antennas 21, analog/digital converters (A/D) 23 each for each of the reception antennas 21, channel estimation units 24 each for each of the reception antennas 21, and a multiantenna demodulation unit 25.

In this configuration, in the transmitter 1, the modulation unit 11 is made to conduct processing such as encoding on transmission data and modulation (for example, QPSK or QAM), and the transmission stream producing unit (transmission data producing means) 12 multiplies the same stream by a transmission antenna weight in an AAA mode (first mode) and forms a multistream in an MIMO mode (second mode), thus selectively producing a transmission data signal for each of the transmission antennas 17.

In this case, the switching (selection) between the MIMO mode and the AAA mode is made according to a mode switching signal (control signal). The mode switching signal can be set fixedly for each transmitter 1, or it can also be switched adaptively for one transmitter 1. For example, in a system configuration which will be described later with reference to FIG. 7, it can be set fixedly for each base station serving as the transmitter 1 and, in a system which will be described later with reference to FIG. 8, it can be switched adaptively according to a distance between a base station 1 serving as the transmitter 1 and a mobile station acting as the receiver 2.

The FFT (orthogonal transformation means) 13 is made to conduct the FFT processing on pilot signals (orthogonal pilots) p1 to p4 orthogonal to each other for establishing orthogonal relation among antennas (carrying out the orthogonal transformation), and the pilot multiplexing unit 14 is made to add (multiplex) the orthogonal pilots p1 to p4, FFT-processed by the FFT 13, to transmission data signals of the respective transmission antennas 17 produced by the transmission stream producing unit 12 (in a known MIMO technique, the orthogonal pilots p1 to p4 are multiplexed directly to transmission data signals).

Each of the D/A converters 15 is for converting each transmission data signal (digital signal), multiplexed with the orthogonal pilots p1 to p4 in the pilot multiplexing unit 14, into an analog signal, and each of the radio transmission units 16 is composed of a frequency converter, a filter, a transmission amplifier and others and is for converting (up-converting) the transmission data signal into a radio frequency to transmit it through the corresponding transmission antenna 17.

On the other hand, in the receiver 2, each of the radio reception units 22 is composed of a low-noise amplifier, a frequency converter, a filter and others, and it is for frequency-converting (down-converting) a radio received signal received by each of the reception antennas 21 into a baseband signal, and each of the A/D converters 23 is for converting an analog baseband signal from the radio reception unit 22 into a digital baseband signal.

Each of the channel estimation units (channel estimation means) 24 is provided for each of the reception antennas 21 and is for making a channel estimation on the basis of the aforesaid digital baseband signal. A correlator 241 correlates a received signal with each of pilot signals p1 to p4 through the use of replica signals (pilot replica) p1 to p4 identical to the transmission side pilot signals p1 to p4 to obtain channel estimates (four) of beams transmitted as an orthogonal multibeam, with these channel estimates being IFFT-processed by inverse fast Fourier converters (IFFT; inverse transformation means) 244, thus obtaining channel estimates (four) of transmission elements. That is, the channel estimates of the beams and the channel estimates of the transmission elements are attainable with respect to all (four) reception antennas 21.

The multiantenna demodulation unit (received signal processing means) 25 is designed to selectively make the switching between the MIMO mode and the AAA mode according to a mode switching signal (hereinafter referred to simply as a "switching signal" or "control signal") so as to conduct a received signal processing (such as an antenna processing, a demodulation and a decoding, etc.), in the AAA mode, select channel estimates (four) of a transmission multibeam before the IFFT processing or carry out the weighting composition for conducting AAA received signal processing (first received signal processing) including channel compensation on the basis of the resultant values and a received antenna signal and to, in the MIMO mode, conduct MIMO received signal processing (second received signal processing) including necessary decoding processing on the basis of channel estimates (four) of transmission elements after the IFFT processing, i.e., a channel matrix (4×4) obtained with respect to all the reception antennas 21 (four), and a received antenna signal.

A detailed description will be given hereinbelow of an operation of the radio communication system thus configured according to this embodiment.

First of all, in the transmitter 1, transmission data undergoes the processing such as encoding and modulation in the modulation unit 11. In the transmission stream producing unit 12, in the MIMO mode according to a mode switching signal, the transmission data is changed to a multistream condition.

On the other hand, in the AAA mode, transmission data signals (four streams) for the multiantenna (the respective transmission antennas 17) are produced by multiplying the same stream by a transmission antenna weight.

Each of the transmission data signals is inputted to the pilot multiplexing 14 where the pilot signals p1 to p4 FFT-processed by the FFT processing unit 13 are added (multiplexed) thereto. Following this, each of the transmission data signals having the added pilot signals p1 to p4 is converted into a digital signal in the corresponding D/A converter 15 and then up-converted into a radio frequency in the radio transmission unit 16 to be transmitted through the corresponding transmission antenna 17.

On the other hand, the receiver 2 receives, by a multiantenna (reception antennas 21), the radio signals transmitted from the transmitter 1. Each of the radio signals is down-converted into an analog baseband signal in the corresponding radio reception unit 22 and is then converted into a digital baseband signal in the corresponding A/D converter 23 to be inputted to the corresponding channel estimation unit 24.

In each of the channel estimation units 24, the correlator 241 correlates a received signal (digital baseband signal) with each of pilots (replica) p1 to p4 through the use of the pilot replicas p1 to p4 to obtain channel estimates (four) of the beams transmitted in the form of an orthogonal multibeam. Moreover, these channel estimates are IFFT-processed by the IFFTs 244 to obtain channel estimates (four) of elements from the transmission antennas 17 to the reception antennas 21. Thus, the channel estimates of the beams and the elements (for the transmission antennas 17) are attained with respect to all (four) reception antennas 21.

The channel estimates of the beams and the elements are inputted to the multiantenna demodulation unit 25 where the switching (selection) between the MIMO mode and the AAA mode is made according to a mode switching signal and the received signal processing is conducted in the selected mode.

That is, in the AAA mode, in the case of the fixed beam transmission from the transmitter 1, pilots and data are transmitted through the use of the same beam and, in the receiver 2 side, one of the channel estimates of the transmission pilot beams can be selected so that the channel estimate is obtainable, thereby conducting the received signal processing (channel compensation). With respect to the other reception antennas 21, the channel estimation is made in like manner and the composition is made between the reception antennas 21, thereby improving the reception characteristics. On the other hand, in the AAA mode, pilots are transmitted through the use of fixed beams from the transmitter 1. In the case of the transmission of data by individual beams, the channel estimate of a transmission pilot beam having highest correlation with respect to the data beam (having the highest reliability) is selected, thereby carrying out the AAA received signal processing (first received signal processing) such as channel compensation. Alternatively, the channel estimates of two or more transmission pilot beams having high correlation (high reliability) are selected and a composition thereof is made after the weighting corresponding to the correlation, thereby achieving the improvement of the characteristics. Incidentally, the characteristic improvement stemming from the composition between the reception antennas 21 is the same as that in the fixed-beam case.

On the other hand, in the MIMO mode, the MIMO received signal processing (second received signal processing) can be conducted through the use of the channel estimates (four) of elements after the IFFT processing in each of the channel estimation units 24, i.e., a channel matrix (4×4) obtained with respect to all the reception antennas 21, and the received antenna signals (outputs of the A/D converters 23).

Incidentally, the transmission side FFT and the reception side IFFT can also be inverted in transmission and reception, such as DFT and IDFT or IFFT and FFT. Moreover, it is also acceptable to appropriately adjust the beam direction of a multibeam while maintaining the relation among the orthogonal beams, provided that the relation between the orthogonal transformation and the inverse transformation thereof is taken.

(A1) Channel Estimation Principle

Figure 2:
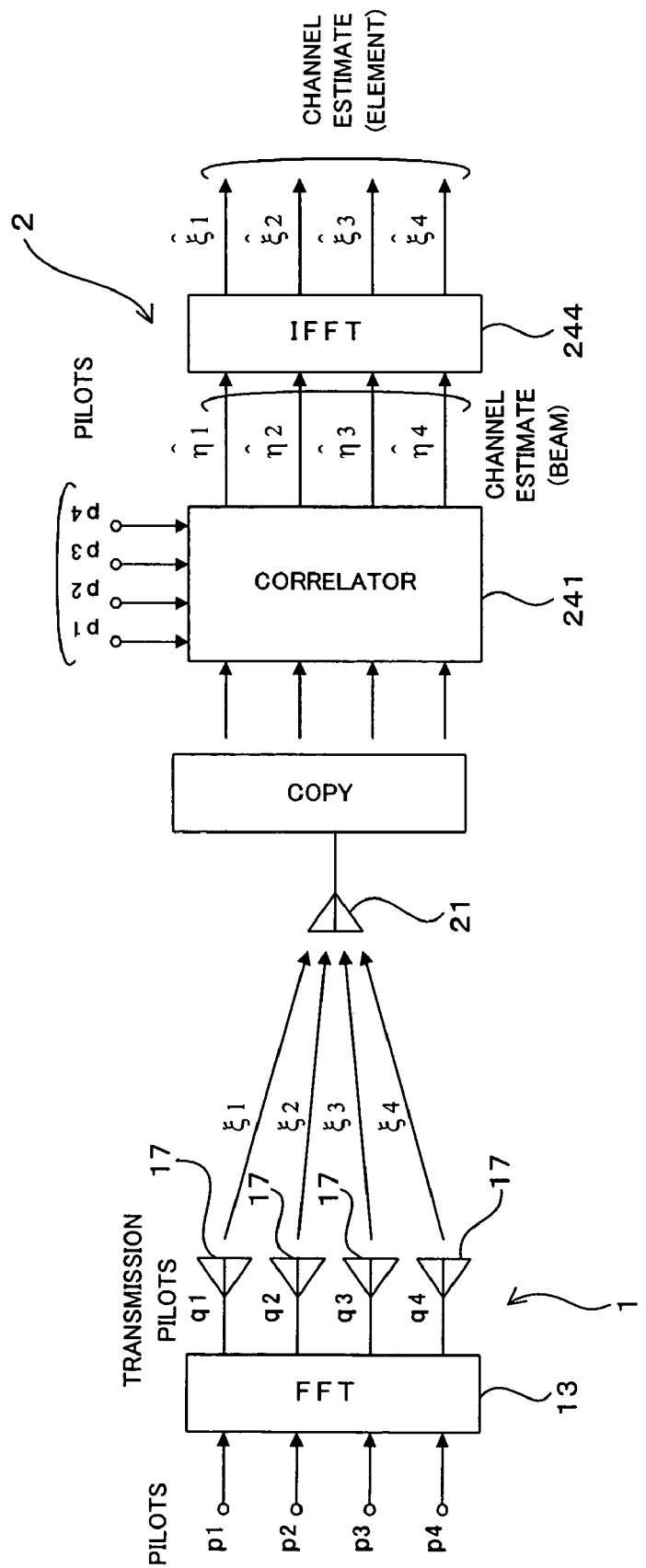
FIG. 2 is an illustration useful for explaining a channel estimation principle in this embodiment.
Figure 3:
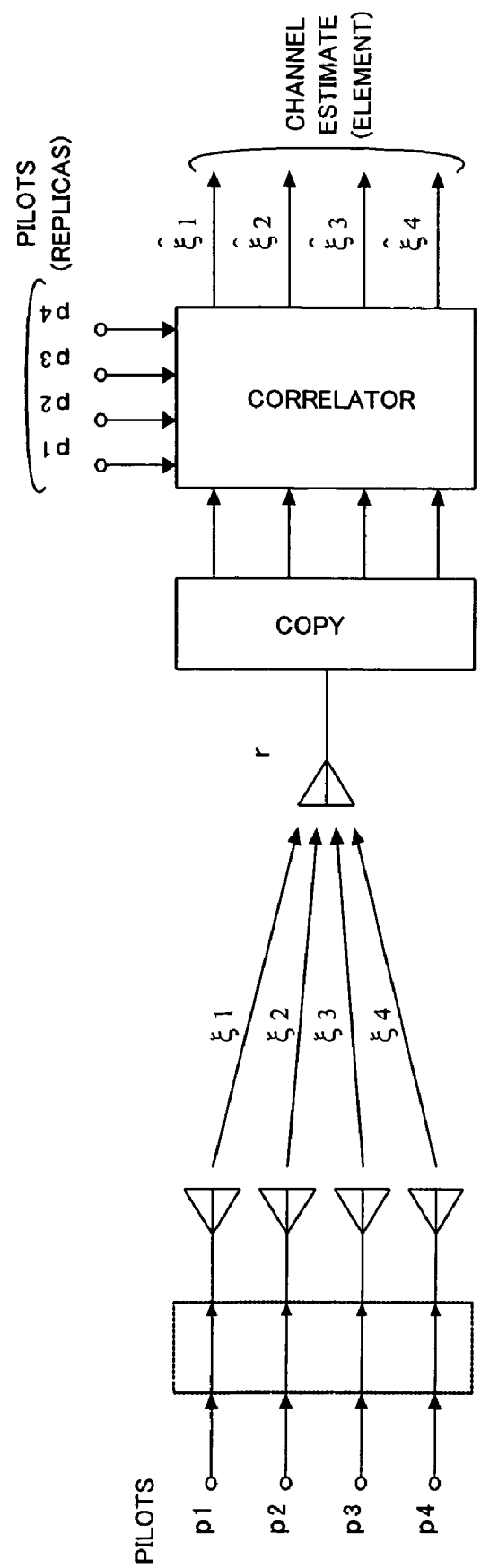
FIG. 3 is an illustration for explaining a channel estimation principle in a known MIMO pilot multiplexing method for the comparison with a channel estimation principle in a pilot multiplexing method according to this embodiment.

Secondly, a description will be given hereinbelow of a channel estimation principle in the receiver 2 (channel estimation unit 24). FIG. 2 is an illustration useful for explaining the channel estimation principle according to this embodiment. The processing in the respective reception antennas 21 are the same, and the description will be given with respect to only on reception antenna. FIG. 3 is an illustration for explaining a channel estimation principle in a known MIMO pilot multiplexing method for the comparison with a channel estimation principle in a pilot multiplexing method according to this embodiment.

Parameters for the description using equations are defined as follows.

Symbol Number: n=1 ... N (N: time period of correlation

Pilot: $p_1(n)$, $p_2(n)$, $p_3(n)$, $p_4(n)$ (having orthogonal relation to each other)

Transmission Antenna Number: i=1 ... 4

Channel: $\xi_1, \xi_2, \xi_3, \xi_4$ (considered to be constant at N)

Received Signal: r(n)

Channel Estimate of Element: $\hat{\xi}_1, \hat{\xi}_2, \hat{\xi}_3, \hat{\xi}_4$ Channel Estimate of Beam: $\hat{\eta}_1, \hat{\eta}_2, \hat{\eta}_3, \hat{\eta}_4$ $$FFT: [FFT] = \frac{1}{2}\begin{bmatrix} 1 & 1 & 1 & 1 \\ 1 & -1 & j & -1 \\ 1 & 1 & -1 & -1 \\ 1 & -1 & -j & j \end{bmatrix}$$

$$IFFT: [IFFT] = [FFT]^{-1} = \frac{1}{2}\begin{bmatrix} 1 & 1 & 1 & 1 \\ 1 & -1 & 1 & -1 \\ 1 & j & -1 & -j \\ 1 & -j & -1 & j \end{bmatrix}$$

Through the use of these parameters, a description will be given hereinbelow of the principle of a channel estimation method.

(A1.1) Known Channel Estimation Method (FIG. 3)

As shown in FIG. 3, transmission pilots are $p_1(n)$, $p_2(n)$, $p_3(n)$, $p_4(n)$.

Moreover, a received (antenna) signal is $r(n)=\xi_1 p_1(n)+\xi_2 p_2(n)+\xi_3 p_3(n)+\xi_4 p_4(n)$.

Therefore, the channel estimate (element) is obtainable through a correlative operation between the received antenna signal and the pilot replica.

That is, $$\hat{\xi}_i = \frac{1}{N}\sum_{n=1}^{N} r(n) p_i *(n) \; (i=1...4)$$

(A1.2) Channel Estimation Method According to this Embodiment (FIG. 2)

On the other hand, as shown in FIG. 2, a transmission signal from the transmitter 1 according to this embodiment is expressed as follows, and the orthogonal pilots are simultaneously transmitted through the use of an orthogonal multi-beam.

$$\begin{bmatrix} q_1(n) \\ q_2(n) \\ q_3(n) \\ q_4(n) \end{bmatrix} = \frac{1}{2}[FFT]\begin{bmatrix} p_1(n) \\ p_2(n) \\ p_3(n) \\ p_4(n) \end{bmatrix} = \frac{1}{2}\begin{bmatrix} 1 & 1 & 1 & 1 \\ 1 & -1 & j & -j \\ 1 & 1 & -1 & -1 \\ 1 & -1 & -j & j \end{bmatrix}\begin{bmatrix} p_1(n) \\ p_2(n) \\ p_3(n) \\ p_4(n) \end{bmatrix}$$

The received signal becomes $r(n)=\xi_1 q_1(n)+\xi_2 q_2(n)+\xi_3 q_3(n)+\xi_4 q_4(n)$ (from comparison with conventional one).

A channel estimate of a beam is obtainable through a correlative operation between a received antenna signal and pilot replica in the correlator 241.

That is, $$\hat{\eta}_i = \sum_{n=1}^{N} r(n)p_i*(n) \ (i=1...4)$$

Moreover, a channel estimate of an element is obtainable by carrying out the IFFT processing on the output (beam channel estimate) of the correlator 241 in the IFFT 244.

That is, $$\begin{bmatrix} \hat{\xi}_1 \\ \hat{\xi}_2 \\ \hat{\xi}_3 \\ \hat{\xi}_4 \end{bmatrix} = [IFFT]\begin{bmatrix} \hat{\eta}_1 \\ \hat{\eta}_2 \\ \hat{\eta}_3 \\ \hat{\eta}_4 \end{bmatrix} = \frac{1}{2}\begin{bmatrix} 1 & 1 & 1 & 1 \\ 1 & -1 & 1 & -1 \\ 1 & j & -1 & -j \\ 1 & -j & -1 & j \end{bmatrix}\begin{bmatrix} \hat{\eta}_1 \\ \hat{\eta}_2 \\ \hat{\eta}_3 \\ \hat{\eta}_4 \end{bmatrix}$$

When this is rewritten, $$\hat{\xi}_i = \sum_{j=1}^{4} [IFFT]_{ij} \hat{\eta}_j \ (i=1...4)$$

As described above, according to this embodiment, the orthogonal pilot signals are FFT-processed in the transmitter 1 and transmitted through the use of an orthogonal multi-beam, while a received signal and each of the pilot replicas are correlated with each other in the receiver 2, thus obtaining channel estimates of beams. Moreover, in the case of the AAA mode, the AAA received signal processing is conducted using one or a plurality of channel estimates to attain received data. Still moreover, in the case of MIMO mode, the channel estimates of all the beams are obtained and then IFFT-processed, thereby obtaining channel estimates (of elements) from all the transmission antennas 17 so that the MIMO received signal processing is conducted thereon to acquire received data.

That is, the pilot signals for MIMO and AAA are commonized, which can realize the coexistence of the MIMO and the AAA by the same antennas and apparatus without adding individual pilots dedicated to directive beam transmission, in other words, without causing a reduction of transmission efficiency (transmission rate) (while realizing higher sector throughput). Therefore, the degree of freedom of the system configuration is improvable. In addition, since there is no need to conduct the transceiving processing involved in the addition of the individual pilots, the complication of circuits is avoidable.

[B] Concrete Example 1 (MIMO/AAA Transmitter-Receiver Configuration)

Figure 4:
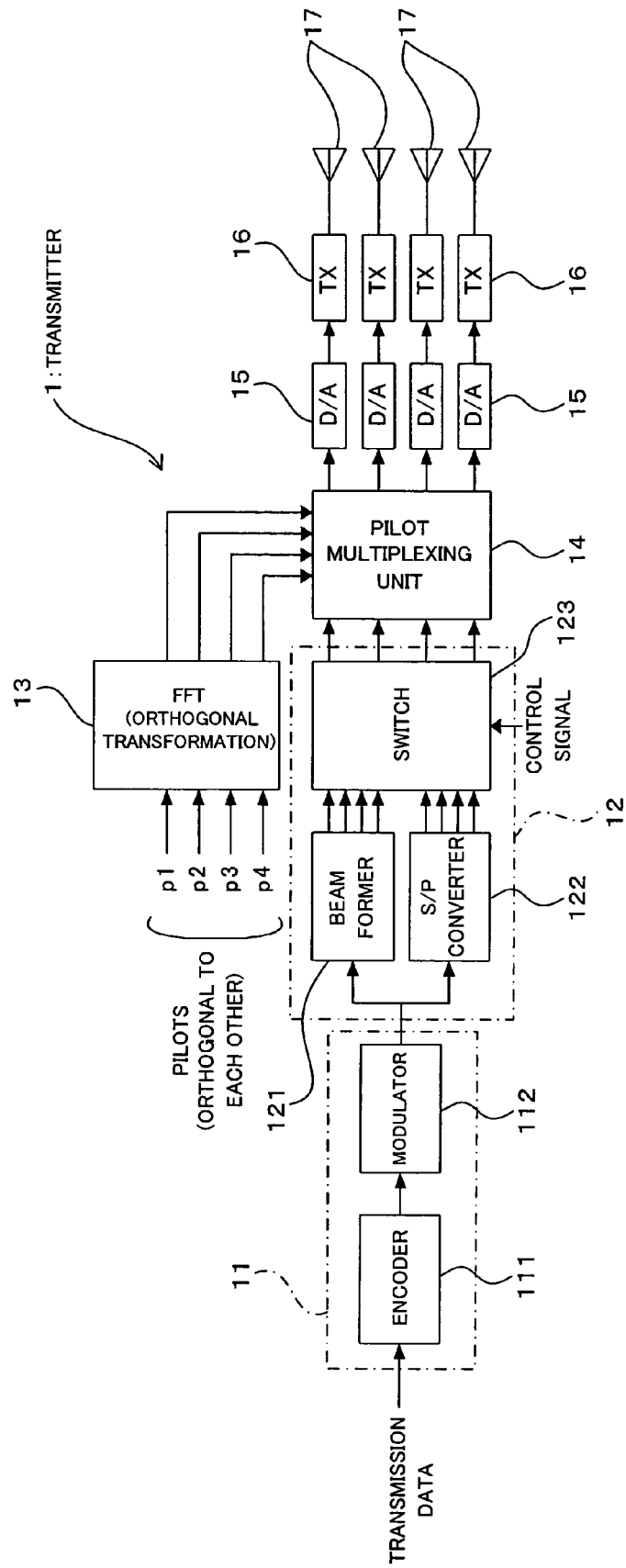
FIG. 4 is a block diagram showing a concrete example of a transmitter shown in FIG. 1.
Figure 5:
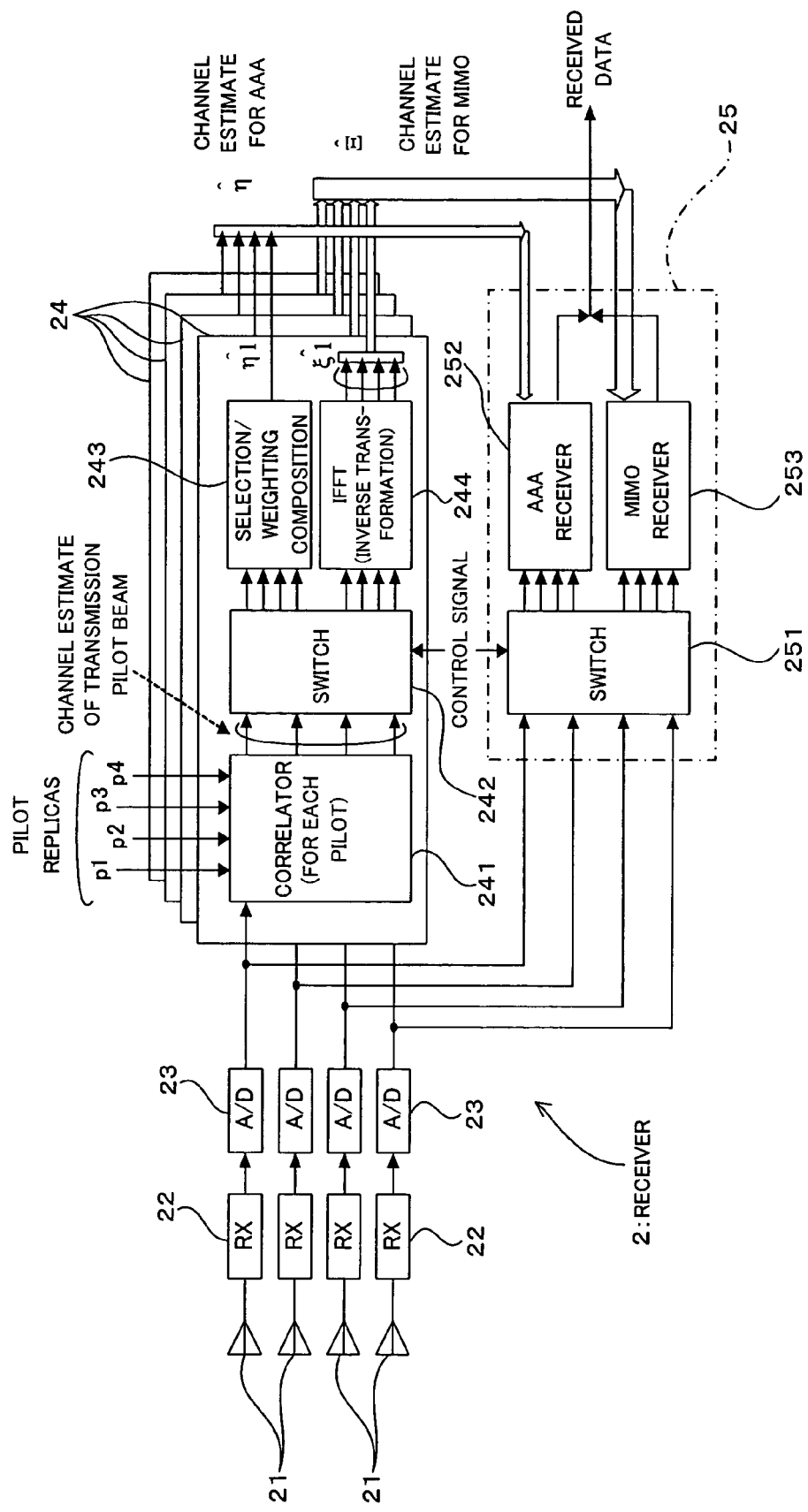
FIG. 5 is a block diagram showing a concrete example of a receiver shown in FIG. 1.

Furthermore, with reference to FIGS. 4 and 5, a description will be given hereinbelow of a detailed configuration of transmitter-receiver capable of achieving the switching between the MIMO mode and the AAA mode. FIG. 4 shows a detailed configuration of the transmitter 1 and FIG. 5 shows a detailed configuration of the receiver 2.

(B1) Transmitter 1

As FIG. 4 shows, in more detail, the above-described transmitter 1 includes an encoder 111 and a modulator 112 as components of the aforesaid modulation unit 11 and includes a beam formation unit (beam former) 121, a serial-parallel converter 122 and a switch 123 as components of the aforesaid transmission stream producing unit 12. In FIG. 4, unless otherwise specified particularly the other components (marked with the same reference numerals as the above-used reference numerals) are the same as the above-mentioned components or correspond thereto.

In this case, in the transmitter 1, the encoder 111 constituting the aforesaid modulation unit 11 is for carrying out the error-correction encoding on transmission data, and the modulator 112 is for digital-modulating the transmission data error-correction-encoded in a required digital modulation mode such as PSK or QAM.

Moreover, in the transmission stream producing unit 12, the beam formation unit 121 is for multiplying a transmission data stream undergoing the aforesaid digital modulation by a transmission array weight (transmission weighting factor) to produce a transmission data stream for the directive multi-beam transmission in the AAA mode, and the serial-parallel converter 122 is for carrying out a serial-parallel conversion on the digital-modulated transmission data stream into the number of transmission antennas (=4) and for distributing them to produce a transmission data multistream in the MIMO mode. The switch 123 is for carrying out the transmission data stream switching (selection) between the MIMO mode and the AAA mode.

With this configuration, the transmission data is error-correction-encoded in the encoder 111 and digital-modulated in a required digital modulation mode such as PSK or QAM in the modulator 112 and then inputted to the beam formation unit 121 and further to the serial-parallel converter 122.

The beam formation unit 121 produces a transmission data stream for the directive multibeam transmission in the AAA mode by multiplying the transmission data stream from the modulator 112 by a transmission array weight (transmission weighting factor). The serial-parallel converter 121 distributes the transmission data stream for the modulator 112 through the serial-parallel conversion into the number of antennas (=4) to produce a transmission data multistream in the MIMO mode.

Each of the outputs of the form formation unit 121 and the serial-parallel converter 122 is inputted to the switch 123, and the switch 123 selectively outputs the outputs of the serial-parallel converter 122 when a control signal is indicative of the MIMO mode while selectively outputting the outputs of the beam formation unit 121 if the control signal is indicative of the AAA mode.

Following this, as mentioned above with reference to FIG. 1, the pilot multiplexing unit 14 adds (multiplexes) the orthogonal pilots p1 to p4, FFT-processed by the FFT 13, to the outputs (transmission data streams) of the switch 123, and the D/A converters 15 converts each of the transmission data streams into an analog signal, and the radio transmission unit 16 then up-converts the converted analog signal into a radio frequency, with it being transmitted through each of the transmission antennas 17.

Figure 9:
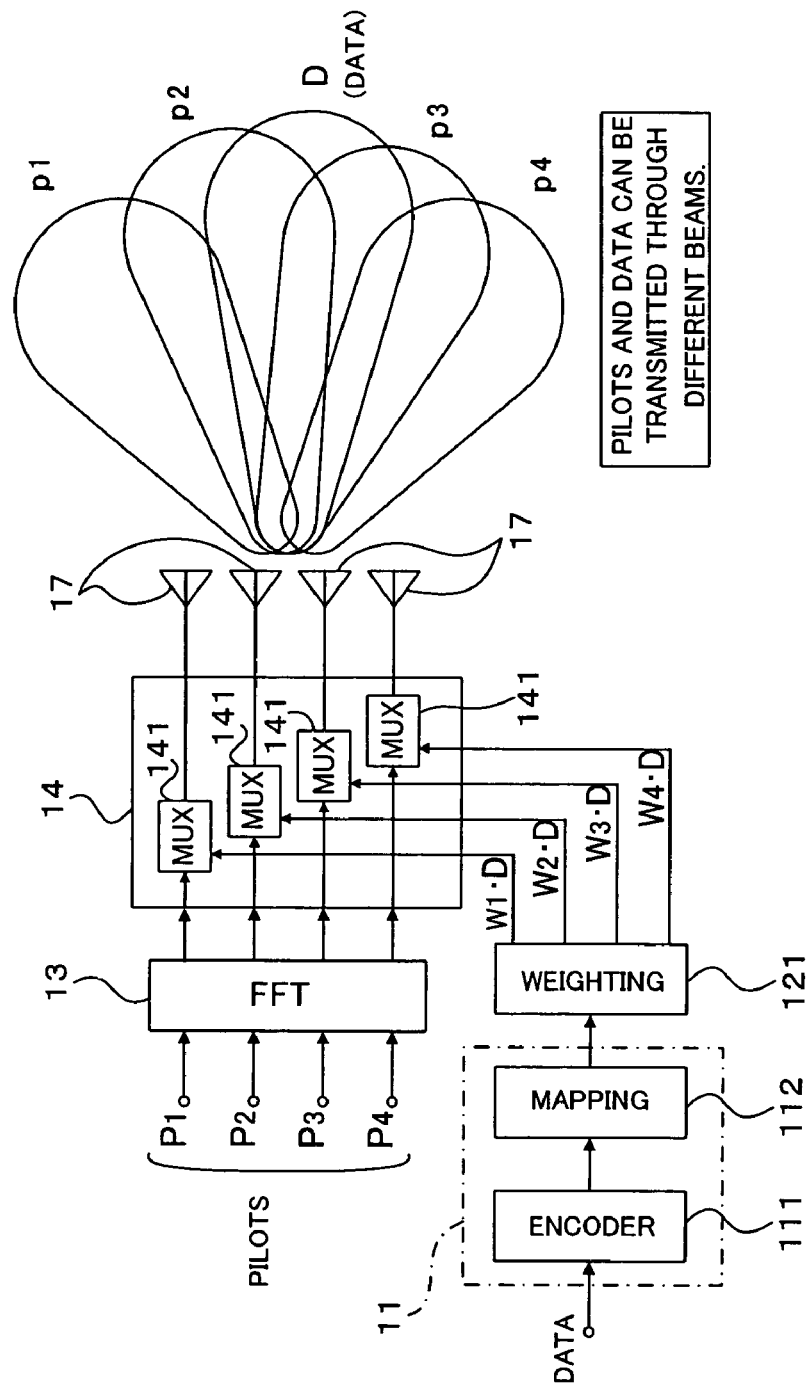
FIG. 9 is an illustration of an image of formation of a directive multibeam in a case in which pilots and data are transmitted through different beams from a transmitter shown in FIGS. 1 and 4.

Incidentally, in the AAA mode, beams for the transmission of data can be the same as the beams of the pilots p1 to p4, and they can also be different therefrom. For example, FIG. 9 shows an beam image in a case in which the pilots p1 to p4 are transmitted from the transmitter 1 through the use of fixed beams and data D are transmitted through individual beams. In FIG. 9, transmission data stream (data) D for each of the transmission antennas 17 is multiplied by transmission weighting factor (weight) W1, W2, W3, W4 in the beam formation unit 121, and the pilots p1, p2, p3 and p4 are then multiplexed by multiplexers (MUX) 141 of the multiplexing unit 14, thus forming a directive multibeam whereby the pilots p1 to p4 and the data D are transmitted through the use of different beams as shown in FIG. 9.

That is, in the transmitter 1, the beam formation unit 121 of the transmission stream producing unit 12 adjusts the weight for transmission data for each of the transmission antennas 17 in the AAA mode. This enables the transmission data and the pilots to be transmitted through the use of the same directive multibeam, or enables them to be transmitted through the use of different directive multibeams.

In addition, as the orthogonal transformation on the orthogonal pilots p1 to p4, when the beam direction of the directive multibeam is appropriately adjusted while maintaining the orthogonal relation of the directive multibeam, it is also possible to form a multibeam taking an intermediate direction between the beams of the directive multibeam.

For example, the following equation (A) indicates a case in which a phase difference (phase turn) is made by 45° for each of the transmission antennas 17.

$$\begin{bmatrix} 1 \\ e^{j\pi/4} \\ e^{j\pi/2} \\ e^{j3\pi/4} \end{bmatrix} = \begin{bmatrix} e^{j0°} \\ e^{j45°} \\ e^{j90°} \\ e^{j135°} \end{bmatrix} \quad (A)$$

When the phase turn of the above-mentioned equation (A) is applied to a weight (transmission weighting factor) for each directive beam which uses an FFT matrix, the following is obtained.

$$\text{Weight Matrix} = \begin{bmatrix} e^{j0°} & e^{j0°} & e^{j0°} & e^{j0°} \\ e^{j45°} & e^{j(135°)} & e^{j135°} & e^{j(-45°)} \\ e^{j90°} & e^{j90°} & e^{j(-90°)} & e^{j(-90°)} \\ e^{j135°} & e^{j45°} & e^{j45°} & e^{j(-135°)} \end{bmatrix}$$

However, the FFT matrix is as follows.

$$[FFT] = \begin{bmatrix} e^{j0°} & e^{j0°} & e^{j0°} & e^{j0°} \\ e^{j0°} & e^{j180°} & e^{j90°} & e^{j(-90°)} \\ e^{j0°} & e^{j0°} & e^{j180°} & e^{j180°} \\ e^{j135°} & e^{j180°} & e^{j(-90°)} & e^{j90°} \end{bmatrix}$$

Therefore, the aforesaid beam formation unit 121 employs the aforesaid weight (matrix), thereby enabling the formation of a multibeam taking an intermediate direction between directive beams while maintaining the orthogonal relation of the directive multibeam formed as an FFT matrix. That is, in this case, the beam formation unit 121 functions as a beam direction adjusting unit to apply a phase turn to the transmission weighting factor with respect to transmission data for each of the transmission antennas 17 in the AAA mode, thereby adjusting the direction of the directive multibeam while maintaining the orthogonal relation of the directive multibeam.

(B2) Receiver 2

Furthermore, in the receiver 2 described above with reference to FIG. 1, in more detail, as shown in FIG. 5, the channel estimation unit 24 includes, in addition to the above-mentioned correlator 241 and IFFT 244, a switch 242 and a selection/weighting composition unit 243, and the multiantenna demodulation unit 25 includes a switch 251, an AAA receiver 252 and an MIMO receiver 253. Also in FIG. 5, unless otherwise specified particularly the other components (marked with the same reference numerals as the above-used reference numerals) are the same as the above-mentioned components or correspond thereto.

In this configuration, in the channel estimation unit 24, the switch 242 is for selectively outputting the output of the correlator 241 to one of the selection weighting composition unit 243 and the IFFT 244 in accordance with a control signal (switching signal). In the AAA mode, the output (channel estimates of the transmission multibeam) of the correlator 241 is outputted to the selection/weighting composition unit 243 while, in the MIMO mode, it is outputted to the IFFT 244.

$\hat{\eta}_i$ (i=1 ... 4) represents an AAA channel estimate (beam) on each reception antenna 21.

$\hat{\xi}_{ij}$ (i=1 ... 4) (j=1 ... 4) represents a channel estimate (element) on the reception antenna number #i with respect to the transmission antenna number #j.

The selection/weighting composition unit 243 is made to select one or more (plurality) of transmission multibeam channel estimates inputted from the switch 242 in the AAA mode and carry out a weighting composition, and the IFFT 244 is made to conduct the IFFT processing on transmission multibeam channel estimates inputted from the switch 242 in the MIMO mode, thus obtaining element channel estimates as mentioned above.

In addition, in the multiantenna demodulation unit 25, the switch 251 is made to selectively output the output (reception antenna signal) of each A/D converter 23 to the AAA receiver 252 or the MIMO receiver 253 in accordance with the above-mentioned control signal, and inputs the aforesaid reception antenna signal to the AAA receiver 252 in the AAA mode and inputs it to the MIMO receiver 253 in the MIMO mode.

The AAA receiver 252 is made to the AAA received signal processing (channel compensation, signal composition between reception antennas 21, and others) on reception antenna signals inputted from the aforesaid switch 251 in the AAA mode through the use of the aforesaid beam channel estimate $\hat{\eta}_i$.

The MIMO receiver 253 is made to carry out the MIMO received signal processing according to a method, such as BLAST (Bell Laboratories Layered Space Time) method, PIC (Parallel Interface Cancellation) method, MLD (Maximum Likelihood Detection) method or the like, through the use of reception antenna signals inputted from the switch 251 in the MIMO mode and a channel estimate (element) $\hat{\xi}_{ij}$ after the IFFT processing by the IFFT 244, thereby obtaining received data.

That is, the radio reception units 22, the A/D converters 23 and the correlators 241 constitute a common section between the MIMO mode and the AAA mode, while the selection weighting composition unit 243 and the AAA receiver 252 constitute an AAA-dedicated section which functions in the AAA mode, and the IFFT 244 and the MIMO receiver 253 organize an MIMO-dedicated section which functions in the MIMO mode, with the sections necessary for the received signal processing being used separately in according with control signals inputted to the switches 242 and 251. Incidentally, although omitted in FIG. 5, a demodulator carrying out demapping according to a digital modulation mode and a decoder carrying out error decoding can also be used in common between the MIMO mode and the AAA mode.

In the receiver 2 thus configured, a radio received signal received through each of the reception antennas 21 is down-converted into an analog baseband signal by the radio reception unit 22 and then converted into a digital baseband signal by the corresponding A/D converter 23 to be inputted to the channel estimation unit 24.

In each of the channel estimation unit 24, the correlator 241 correlates the received signal (digital baseband signal) with each of the pilots (replicas) p1 to p4 through the use of pilot replicas p1 to p4 to obtain channel estimates (four) of the beams transmitted as an orthogonal directive multibeam.

The obtained channel estimates are selectively inputted to the selection/weighting composition unit 243 or the IFFT 244 through the switch 242 in accordance with a control signal. That is, in the AAA mode, the channel estimate is inputted to the selection/weighting composition unit 243 while, in the MIMO mode, it is inputted to the IFFT 244. The selection/ weighting composition unit 243 selects, from the aforesaid beam channel estimates, one or more (plurality) having a high correlation with the pilot replicas p1 to p4 and then carries out a weighting composition to obtain a channel estimate $\hat{\eta}_i$ for the data demodulation, with this channel estimate $\hat{\eta}_i$ being inputted to the AAA receiver 252.

The AAA receiver 252 carries out the AAA received signal processing (channel compensation, signal composition between reception antennas 21, and others) through the use of reception antenna signals inputted through the switch 251 according to the aforesaid control signal (AAA mode) and the aforesaid channel estimate $\hat{\eta}_i$, thereby attaining received data.

On the other hand, in the MIMO mode, the channel estimates of all the beams obtained by the correlators 241 are inputted through the switch 242 to the IFFT 244 to be IFFT-processed to attain an element channel estimate $\hat{\xi}_{ij}$ from each of the transmission antennas 17 to one reception antenna 21 for each of the reception antennas 21, with the element channel estimate $\hat{\xi}_{ij}$ being inputted to the MIMO receiver 253.

The MIMO receiver 253 conducts the MIMO received signal processing according to a method such as BLAST, PIC or MLD through the use of received antenna signals inputted through the switch 251 in accordance with the aforesaid control signal (MIMO mode) and the aforesaid element channel estimate $\hat{\xi}_{ij}$, thereby acquiring received data.

Incidentally, in a case in which, in the AAA mode, the information on the directive beams of the channel estimates selected by the aforesaid selection/weighting composition unit 243, or the directive beams corresponding to two or more channel estimates obtained through the weighting composition according to selection/correlation values (degree of reliability) and the information on the degree of reliability, are feedbacked to the transmitter 1, the transmitter 1 can transmit transmission data with directive beams specified on the basis of the feedbacked information or with directive beams obtained by weighting two or more directive beams according to the degree of reliability. This further improves the communication quality in the AAA mode.

[C] Concrete Example 2 (Application of Various Types of Receivers)

Figure 6:
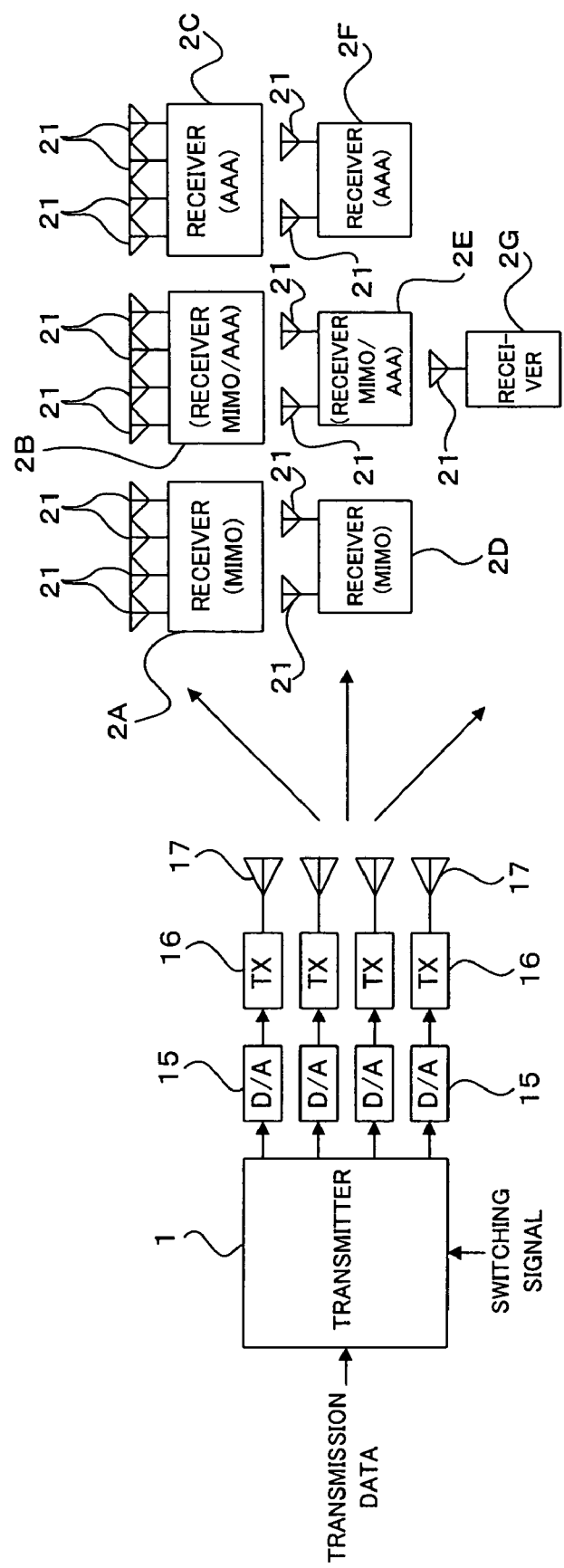
FIG. 6 is a block diagram for application of various types of receivers according to this embodiment.

In a case in which, as described above, the transmitter 1 is made to be capable of making the switching between MIMO and AAA in a four-antenna configuration, as the receiver 2, various types are applicable to a radio communication system, for example, as shown in FIG. 6.

That is, a receiver 2G with one-antenna configuration, a receiver 2D with a two-antenna configuration dedicated to the MIMO mode, a receiver 2A with a four-antenna configuration dedicated to the MIMO mode, a receiver 2F with a two-antenna configuration dedicated to the AAA mode, a receiver 2C with a four-antenna configuration dedicated to the AAA mode, a receiver 2E with a two-antenna configuration capable of making the switching between MIMO and AAA and a receiver 2B with a four-antenna configuration capable of making the switching between MIMO and AAA, and other receivers are also applicable thereto.

In this case, the transmitter 1 is capable of making transmissions while making the switching between the MIMO mode and the AAA mode irrespective of the number of antennas and circuit arrangement of the receivers 2A to 2G and is capable of making more efficient communications with respect to any one of the receivers 2A to 2G. Moreover, the respective receivers 2A to 2G can have a degree of freedom to satisfy the requirements at any given time in respect of transmission rate, equipment scale, dissipation power, cost and others. In particular, in the case of a mobile communication system, the understanding becomes easy if the transmitter 1 is considered as a base station and the receivers 2A to 2G are considered as a mobile terminal.

Although various internal circuit arrangements are considerable according to the number of antennas of the receivers 2A to 2G, the configuration of the receiver 2 generalized as the number of antennas=4 becomes as described above with reference to FIG. 1. It shows the best characteristic in view of transmission rate and communication quality in various environments. The features of the various types of transmitter configurations are shown in the following table 2.

TABLE 2

Features of Various Types of Receiver Configurations

| Types of Receiver Configurations | Features |
|---|---|
| 4 Antennas for MIMO | configuration for the purpose of only high-speed data transmission<br>use only in the vicinity of transmitter 1<br>no need for AAA-dedicated circuit in multiantenna demodulation unit 25 shown in FIGS. 1 and 5 |

TABLE 2-continued

Features of Various Types of Receiver Configurations

| Types of Receiver Configurations | Features |
|---|---|
| 4 Antennas for MIMO/AAA | circuit arrangement described with reference to FIGS. 1 and 5<br>high-speed rate data transmission in the vicinity of transmitter 1<br>acquisition of communication quality at place distant from transmitter 1 |
| 4 Antennas for AAA | acquisition of communication quality irrespective of distance from transmitter 1<br>no need for MIMO-dedicated circuit in multiantenna demodulation unit 25 shown in FIGS. 1 and 5 |
| 2 Antennas for MIMO | decrease in number of antennas and internal circuit scale<br>decrease in transmission rate to approximately ½ |
| 2 Antennas for MIMO/AAA | decrease in number of antennas and internal circuit scale in comparison with 4 antennas for MIMO/AAA<br>decrease in maximum transmission rate and reception sensitivity to approximately ½ |
| 2 Antennas for AAA | decrease in number of antennas and internal circuit scale in comparison with 4 antennas for AAA<br>decrease in reception sensitivity to approximately ½ |
| 1 Antenna | considerable reduction in internal circuit scale<br>decrease in transmission rate and reception sensitivity to approximately ¼ with respect to 4 antennas and approximately ½ with respect to 2 antennas |

As described above as examples, the application to the receivers 2A to 2G having different numbers of antennas and different internal circuit arrangements is feasible, which can realize a configuration of a radio communication system with high degree of freedom.

[D] Concrete Example 3 (Mode of Application to Radio Communication System)

Figure 7:
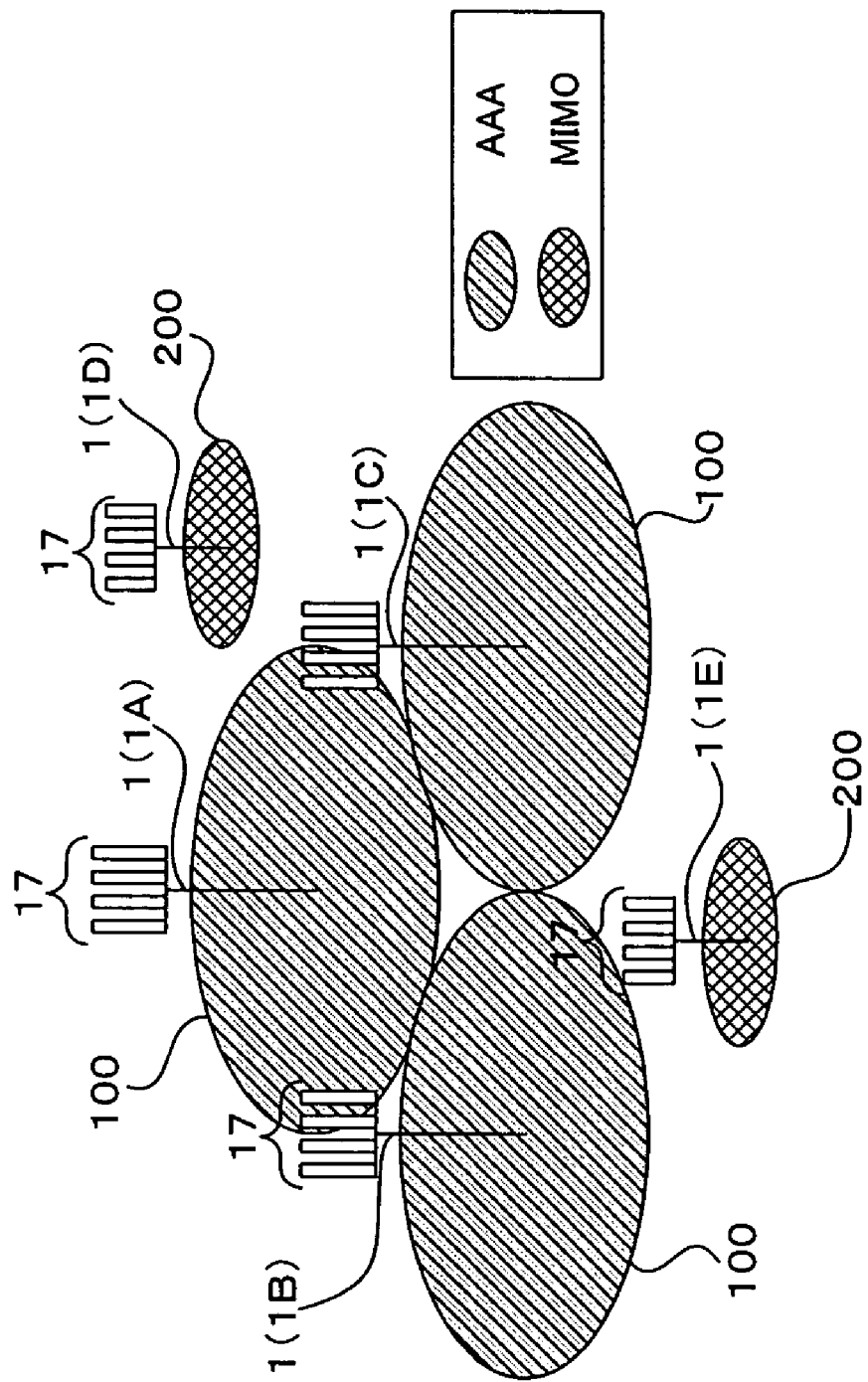
FIG. 7 is an illustration of a system configuration designed to use an MIMO mode and an AAA mode separately according to an application environment according to this embodiment.
Figure 8:
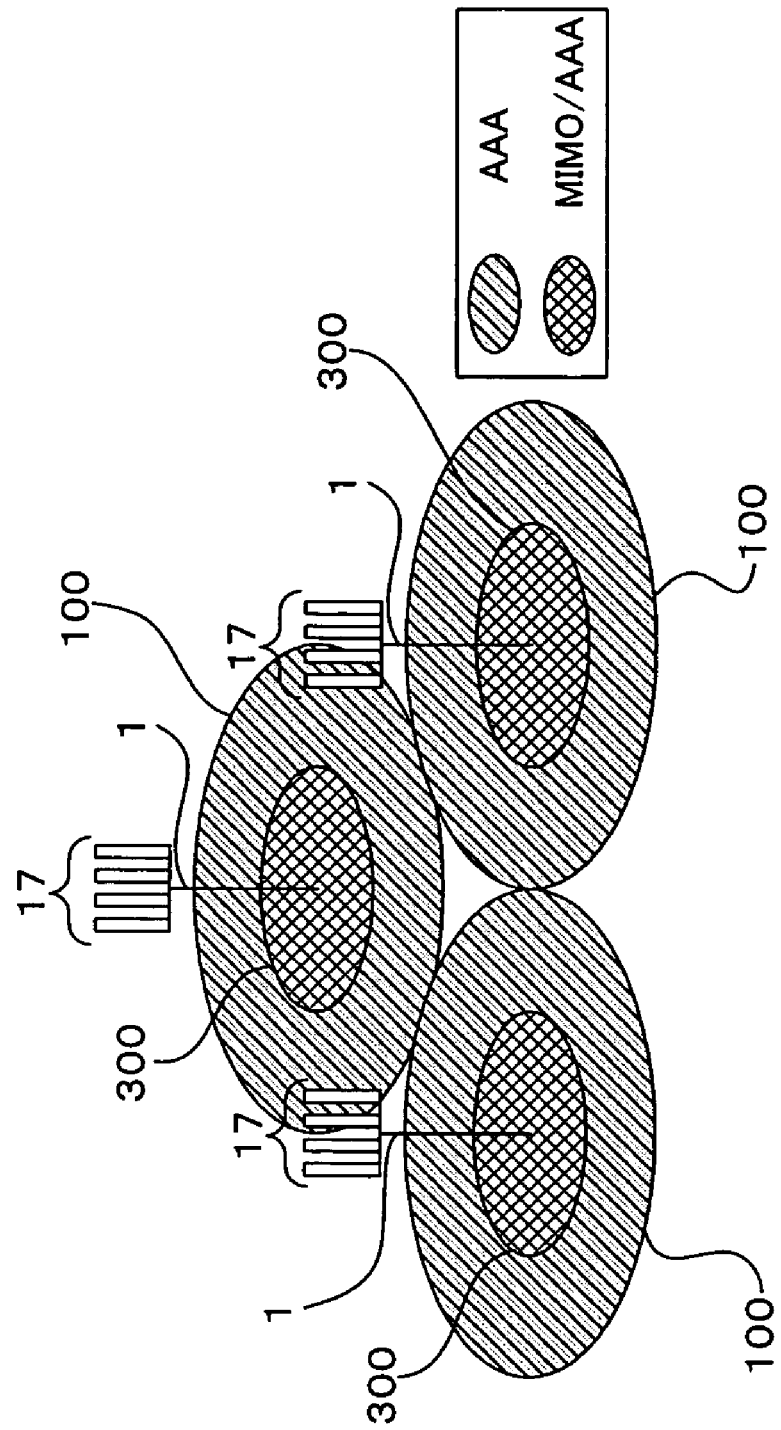
FIG. 8 is an illustration of a system configuration for the switching between MIMO and AAA modes through the use of the same base station according to this embodiment.

Although the aforesaid concrete examples 1 and 2 relate to the configurations of the transmitter 1 and the receiver 2 (2A to 2G), in this concrete example 3, a description will be given of a mode of application to a radio communication system. FIGS. 7 and 8 are illustrations of examples of application to a radio communication system (mobile communication system). The description will be given of a case of down-link data transmission. That is, a base station side serves as the transmitter 1 while a terminal side acts as the receiver 2.

(D1) FIG. 7 shows a system configuration designed to use the MIMO mode and the AAA mode separately according to application environments.

In FIG. 7, three cellular cells 100 adjacent to each other are formed by three base stations (transmitters) 1A, 1B and 1C adjacent to each other, and isolated cells 200 at enclaves with respect to the cellular cells 100 are formed by base stations 1D and 1E at positions distant from the base stations 1A, 1B and 1C.

The cellular cells 100 are dedicated to the AAA mode while the isolated cells 200 are dedicated to the MIMO mode. That is, in this case, the base stations (transmitters) 1A, 1B and 1C operate only in the AAA mode and transmit transmission data through a directive multibeam from the respective transmission antennas 17, while the base stations (transmitters) 1D and 1E operate in the MIMO mode and transmit independent transmission data from the respective transmission antennas 17.

A mobile station (receiver) 2 makes the switching between the MIMO mode and the AAA mode in accordance with whether it exists in the AAA mode cellular cell (AAA area) 100 or in the MIMO mode isolated cell (MIMO area) 200. With respect to the area in which the mobile station (hereinafter referred to equally as a "terminal") 2 exists, for example, the mobile station 2 can recognize it in a manner such that the base station 1 broadcasts information (mode identification information) indicative of AAA or MIMO through a common channel (broadcasting channel).

That is, in a state where the MIMO mode and the AAA mode coexist in the same radio communication system, the base station 1 operating in the MIMO mode is employed when communications are made in a relatively small range such as isolated cell environment or microcell environment, and the base station 1 operating in the AAA mode is employed when communications are made in a relatively large range such as cellular (macrocell) environment.

Thus, a base station (transmitter) 1 having a common configuration for both the MIMO and AAA modes is prepared so as to cope with services in both the modes, which eliminates the need for the preparation of base stations (transmitters) having configurations different according to the services in different modes and enables construction of flexible systems while reducing the system costs.

(D2) On the other hand, FIG. 8 shows an MIMO/AAA mode switching system configuration using the same transmission antenna 17 (base station 1).

In FIG. 8, each of three base stations 1 adjacent to each other covers the entire area in the AAA mode and, since a strong received signal and large SIR are obtainable in an area (small concentric circle) 300 in the vicinity of each base station 1, this area is used as an area (MIMO/AAA area) where, in addition to the services in the AAA mode, high-speed data transmission is feasible in the MIMO mode.

In this case, the configuration of the base station (transmitter) 1 is designed as the above-mentioned MIMO/AAA mode switching configuration, and transmissions are made in a manner such that the operating modes are switched in accordance with the position of the terminal (receiver) 2 to which data is to be transmitted and its receiver configuration (see FIG. 6 and table 2). For example, to the mobile station 2 positioned in the area 300 near the base station 1, transmission data is independently transmitted from each transmission antenna 17 in the MIMO mode, and to the mobile station 2 positioned in a distant area other than the area 300 near the same base station 1, transmission data is transmitted through a directive multibeam from each transmission antenna 17 in the AAA mode.

Incidentally, for example, the terminal position can be specified on the basis of feedback information on received signal strength intensity or received signal quality information or the like, and the receiver configuration can be made to notify the information on its own configuration type from each mobile station 2 to the base station 1. That is, it is realizable through the use of a method similar to the existing loop control between the base station 1 and the mobile station 2.

The system configuration described above can improve the communication quality (SIR) by carrying out the high-speed data transmission in the MIMO mode in the vicinity (MIMO/AAA area 300) of the base station (transmitter) 1 and by making communications in the AAA mode (directive multibeam) at a place (cell end portion) distant from the base station (transmitter) 1, thus achieving the SIR improvement of the entire system and the improvement of high sector (cell) throughput (compatibility).

It should be understood that the present invention is not limited to the above-described embodiment, and that it is intended to cover all changes and modifications of the embodiment of the invention herein which do not constitute departures from the spirit and scope of the invention.

As described above, according to the present invention, pilot signals for different modes such as AAA and MIMO can be commonized to realize the coexistence of the different modes in the same antenna and apparatus without adding individual pilots dedicated to directive beam transmission, which can improve the degree of freedom of the system configuration. In addition, since there is no need to carry out transceiving processing involved in the addition of individual pilots, the complication of circuits is avoidable. Therefore, it is considered that the present invention is extremely useful in the field of radio communication technology.

What is claimed is:

1. A radio communication system comprising:
   a radio transmitter including:
   a plurality of transmission antennas;
   a transmission data producing unit selectively producing (a) transmission data to be transmitted with a directive multibeam from said plurality of transmission antennas in a first mode or (b) transmission data to be independently transmitted from said plurality of transmission antennas in a second mode;
   an orthogonal transformation unit carrying out an orthogonal transformation on a plurality of pilot signals having an orthogonal relation to each other so as to form said directive multibeam having an orthogonal relation to each other; and
   a pilot multiplexing unit multiplexing said orthogonally transformed pilot signals produced by said orthogonal transformation unit and said transmission data produced by said transmission data producing unit; and
   a radio receiver including:
   a plurality of reception antennas;
   a channel estimation unit correlating, for each of said plurality of reception antennas, a received signal received by said reception antenna with a replica signal of each of said pilot signals to obtain a channel estimate of said directive multibeam;
   an inverse transformation unit carrying out an inverse transformation of said orthogonal transformation on said channel estimate of said directive multibeam obtained by said channel estimation unit to obtain a channel estimate corresponding to one of said plurality of transmission antennas; and
   a received signal processing unit selectively conducting (a) first received signal processing on the basis of said channel estimate of said directive multibeam obtained by said channel estimation unit and said received signal in said first mode, or (b) second received signal processing on the basis of said channel estimate corresponding to said one of said plurality of transmission antennas obtained by said inverse transformation unit and said received signal in said second mode.

2. A radio communication method for a radio communication system including a radio transmitter having a plurality of transmission antennas and a radio receiver having a plurality of reception antennas, said method comprising the steps of,
   in the radio transmitter,
   selectively producing (a) transmission data to be transmitted with a directive multibeam from said plurality of transmission antennas in a first mode or (b) transmission data to be independently transmitted from said plurality of transmission antennas in a second mode;
   carrying out an orthogonal transformation on a plurality of pilot signals having an orthogonal relation to each other so as to form said directive multibeam having the orthogonal relation;
   multiplexing the orthogonally transformed pilot signals and said transmission data and transmitting the multiplexed data through said plurality of transmission antennas; and
   in said radio receiver,
   correlating, for each of said reception antennas, a received signal received by said reception antenna with a replica signal of each of said pilot signals to obtain a channel estimate of said directive multibeam;
   carrying out an inverse transformation of said orthogonal transformation on the obtained channel estimate of said directive multibeam to obtain a channel estimate corresponding to one of said plurality of transmission antennas; and
   selectively conducting (a) first received signal processing on the basis of said channel estimate of said directive multibeam and said received signal in said first mode, or (b) second received signal processing on the basis of said channel estimate corresponding to said one of said plurality of transmission antennas, obtained through said inverse transformation, and said received signal in said second mode.

3. The radio communication method according to claim 2, wherein, in said radio transmitter, a fast Fourier transformation (FFT) is conducted as said orthogonal transformation and, in said radio receiver, an inverse fast Fourier transformation (IFFT) is conducted as said inverse transformation.

4. The radio communication method according to claim 2, wherein, in said radio transmitter, a discrete Fourier transformation (DFT) is conducted as said orthogonal transformation and, in said radio receiver, an inverse discrete Fourier transformation (IDFT) is conducted as said inverse transformation.

5. The radio communication method according to claim 2, wherein, in said radio transmitter, a phase turn is applied to a transmission weighting factor on said transmission data for each of said plurality of transmission antennas in said first mode so as to adjust a direction of said directive multibeam while maintaining the orthogonal relation of said directive multibeam.

6. The radio communication method according to claim 2, wherein, in said radio transmitter, a transmission weighting factor on said transmission data for each of said plurality of transmission antennas is adjusted in said first mode to transmit said transmission data and said pilot signals in the same directive multibeam.

7. The radio communication method according to claim 2, wherein, in said radio transmitter, a transmission weighting factor on said transmission data for each of said plurality of transmission antennas is adjusted in said first mode to transmit said transmission data and said pilot signals in different directive multibeams.

8. The radio communication method according to claim 2, wherein, in said radio receiver, in said first mode, a channel estimate of a directive beam having the highest correlation is selected from channel estimates of said directive multibeam obtained with respect to said reception antennas so that the selected channel estimate is used in said first received signal processing.

9. The radio communication method according to claim 2, wherein, in said radio receiver, in said first mode, two or more channel estimates of directive beams having higher correlation are selected from channel estimates of said directive multibeam obtained with respect to said reception antennas so that a composition, which is made on the selected channel estimates through weighting according to said correlation, is used in said first received signal processing.

10. The radio communication method according to claim 9, wherein said radio receiver feedbacks information on said directive beams having the selected channel estimates to said radio transmitter, and said radio transmitter transmits said transmission data through the use of the directive beams specified from the feedbacked information.

11. The radio communication method according to claim 10, wherein said radio receiver feedbacks information on the directive beams corresponding to the two or more selected channel estimates and on said correlation to said radio transmitter, and said radio transmitter transmits said transmission data through the use of directive beams obtained by weighting said two or more directive beams, specified from the feedbacked information, according to said correlation.

12. The radio communication method according to claim 2, wherein a base station is provided as said radio transmitter and a mobile station is provided as said radio receiver, and
  (a) when said mobile station is positioned in an area near said base station, said transmission data is transmitted independently of each of said transmission antennas in said second mode to said mobile station positioned in said area near said base station, and
  (b) when said mobile station is positioned in a distant area other than said area near said base station, said transmission data is transmitted through the use of said directive multibeam from said transmission antennas in said first mode to said mobile station positioned in said distant area other than said area near said base station.

13. A radio transmitter comprising:
a plurality of transmission antennas;
a transmission data producing unit selectively producing
  (a) transmission data to be transmitted with a directive multibeam from said plurality of transmission antennas in a first mode or (b) transmission data to be independently transmitted from the plurality of transmission antennas in a second mode;
an orthogonal transformation unit carrying out an orthogonal transformation on a plurality of pilot signals having orthogonal relation to each other so as to form said directive multibeam having the orthogonal relation; and
a pilot multiplexing unit multiplexing said orthogonally transformed pilot signals produced by said orthogonal transformation unit and said transmission data produced by said transmission data producing unit.

14. The radio transmitter according to claim 13, wherein said orthogonal transformation unit conducts a fast Fourier transformation (FFT) as said orthogonal transformation.

15. The radio transmitter according to claim 13, wherein said orthogonal transformation unit conducts a discrete Fourier transformation (DFT) as said orthogonal transformation.

16. The radio transmitter according to claim 13, wherein said transmission data producing unit includes a beam direction adjusting unit for applying a phase turn to a transmission weighting factor on said transmission data for each of said plurality of transmission antennas in said first mode to adjust a direction of said directive multibeam while maintaining the orthogonal relation of said directive multibeam.

17. The radio transmitter according to claim 13, wherein said transmission data producing unit is made to adjust a transmission weighting factor on said transmission data for each of said plurality of transmission antennas in said first mode for transmitting said transmission data and said pilot signals in the same directive multibeam.

18. The radio transmitter according to claim 13, wherein said transmission data producing unit is made to adjust a transmission weighting factor on said transmission data for each of said plurality of transmission antennas in said first mode for transmitting said transmission data and said pilot signals in different directive multibeams.

19. A radio receiver comprising:
  a plurality of reception antennas for receiving a signal transmitted from a plurality of transmission antennas, said signal being a multiplexed signal of pilot signals having orthogonal relation to each other and first transmission data to be transmitted through a directive multibeam from said plurality of transmission antennas in a first mode, or said signal being a multiplexed signal of said pilot signals and second transmission data to be transmitted independently from said plurality of transmission antennas in a second mode, said pilot signals being carried out by an orthogonal transformation between the plurality of transmission antennas of a radio transmitter;
  a channel estimation unit correlating, for each of said reception antennas, said received signal received by said reception antenna with a replica signal of each of said pilot signals to obtain a channel estimate of said directive multibeam;
  an inverse transformation unit carrying out an inverse transformation of said orthogonal transformation on said channel estimate of said directive multibeam obtained by said channel estimation unit to obtain a channel estimate corresponding to one of said plurality of transmission antennas; and
  a received signal processing unit selectively conducting (a) first received signal processing on the basis of said channel estimate of said directive multibeam obtained by said channel estimation unit and the received signal in said first mode, or (b) second received signal processing on the basis of said channel estimate corresponding to said one of said plurality of transmission antennas obtained by said inverse transformation unit and the received signal in said second mode.

20. The radio receiver according to claim 19, wherein said orthogonal transformation in said radio transmitter is a fast Fourier transformation (FFT), and said inverse transformation unit conducts an inverse fast Fourier transformation (IFFT) as said inverse transformation.

21. The radio receiver according to claim 19, wherein said orthogonal transformation in said radio transmitter is a discrete Fourier transformation (DFT), and said inverse transformation unit conducts an inverse discrete Fourier transformation (IDFT) as said inverse transformation.

22. The radio receiver according to claim 19, wherein said channel estimation unit includes a selection unit for selecting a channel estimate of said directive beam having the highest correlation from the channel estimates of said directive multibeam obtained with respect to said reception antennas and for outputting the selected channel estimate to said received signal processing unit.

23. The radio receiver according to claim 19, wherein said channel estimation unit includes a weighting composition unit for making a composition on, of said channel estimates of said directive multibeam obtained with respect to said reception antennas, two or more channel estimates of directive beams having higher correlation through the use of weighting according to said correlation and for outputting a result of the composition to said received signal processing unit.

* * * * *